July 1, 1930.   W. H. DAVID   1,769,663
TIRE VALVE AND CAP
Filed Nov. 26, 1926   2 Sheets-Sheet 1

WITNESSES
Theo. W. Woglom
Herbert Lunt Jr.

INVENTOR
William H. David
By Attorney
F. W. Hillard

UNITED STATES PATENT OFFICE

WILLIAM H. DAVID, OF TOTTENVILLE, NEW YORK

TIRE VALVE AND CAP

Application filed November 26, 1926. Serial No. 150,975.

This invention relates to tire valves and caps for automobile tires and other pneumatic wheel tires.

Such valves as heretofore used on automobiles include the valve casing, the check valve therein, the valve cap and the dust cap. I intend my improved valve cap for use on such usual tire valves, or valves of the usual or ordinary size, by the substitution of my valve cap thereon in place of the usual valve cap.

The tire valves ordinarily used heretofore vary in some of their features but, so far as I am aware, the reduced threaded upper end of the valve casing, on which the valve cap screws, is the same size in all cases and the internal diameter of the dust cap is substantially the same in all cases. My improved valve cap is threaded to screw onto the reduced threaded upper end of the usual casing, and it is of substantially the same sized diameter as the usual cap, so that the usual dust cap will pass thereover. But my valve cap is of materially greater length than said usual valve cap.

The reason for making my valve cap longer is in order to employ a large soft resilient member in the cap for sealing the top of the valve casing, instead of the thin disc packing heretofore ordinarily used in the usual valve caps. My large sealing member will obviously maintain its resiliency (sealing life) much longer under the sealing pressure, than said thin disc packing. Thus my improved sealing member will constitute an air tight seal for a much longer period and it will also remain friction tight and continue to resist the jars and jolts of the going car (which tend to loosen the cap so that it falls off of the casing) for periods proportional to the longer resilient life of my improved sealing member.

Another advantage of my improved sealing member is that if it be made ball shaped or convex on the central portion of its lower surface, it will, due to its large resilient mass, under the sealing pressure, crowd down into the bore of the casing and engage the usual deflating stem and open the check valve substantially simultaneously with the sealing of the top of the casing. This will obviously greatly lengthen the life of the check valve, and, with my large sealing member, is safe practice, because the latter constitutes a reliable air tight, friction tight seal for the whole period of life of the inner tube.

Not only is my improved valve cap longer than the said usual cap, but it also differs in this additional respect, namely that, whereas said usual cap is finished and the packing washer then inserted, my sealing member must be inserted in the cap before the cap is finished. The reason for this difference is the following, viz:

In both cases, mine and the usual valve cap, the sealing member is contained in an internal chamber above and of larger diameter than the threaded bore of the neck, and in both cases the diameter of the sealing member is larger than said bore. But in the case of the usual valve cap said thin packing washer can be collapsed into diameter small enough to be pushed through said bore and will then reassume its flat disc form in the enlarged chamber. But my improved sealing member is too long to be so collapsed. Hence my cap must first be left full diameter, at one end or the other for the insertion of my large sealing member, and then the cap can be finished, with the sealing member therein, which it thus serves to confine.

Without in any way limiting the scope of my invention, I call attention that my improved valve cap and sealing member therein are particularly valuable in connection with balloon tires, because of the low air pressure therein and the consequent need of confining such pressure within minimum limits.

In the drawings, which form a part of the specification, I have shown my improvements applied to the well known Schrader valve. Referring to the drawings.

In each of the forms shown the sealing member is of diameter larger than the reduced upper end of the valve casing and extends completely across and over the casing, so that when the cap is screwed down tightly upon said upper end, the sealing member will be forced down air tight against the casing, thus constituting a reliable air tight, friction tight seal that will successfully resist all jars and vibrations, even on rough roads. Hence the air pressure will be maintained in the inflated tire for a long time, even in the low pressure balloon tire. My seal is so perfect that, preferably, I leave the check valve open, excepting only when inflating or deflating the tire.

Figures 1, 2:
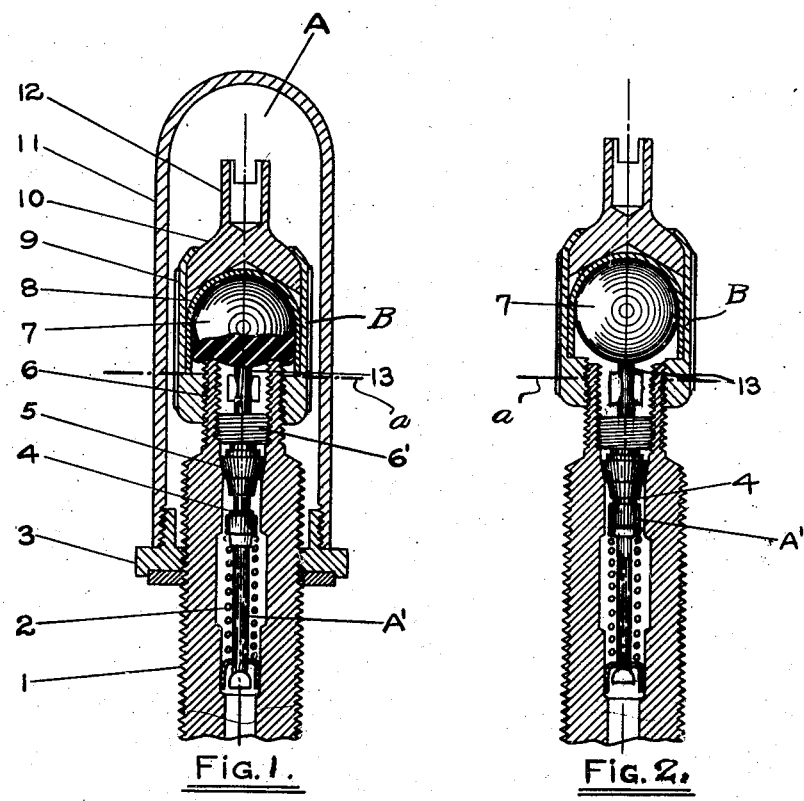
Fig. 1 is an enlarged vertical sectional view, of one form of my improved valve cap and sealing member, and a portion of the upper end of the valve casing to which the cap is applied. In this view the sealing valve is closed, the check valve is open, and the usual dust cap is shown assembled on the valve casing over my valve cap.
Fig. 2 is a view corresponding with Fig. 1 but with the sealing valve open and the check valve closed, the dust cap not being shown.

In the drawings, I have designated the entire valve assembly, as an entity, by the reference character A. An illustration of such assembly is shown in Fig. 1.

I have designated the usual check valve assembly by the reference character A'. Such assembly includes, among other parts, the parts numbered in the drawings 2, 4, 5, 6, 6' and 13. The valve cap assembly of Figs. 1 and 2 is designated by reference character B; that of Fig. 3, by reference character B'.

Preferably I employ soft vulcanized rubber for the sealing members 7, 7', of my improved cap assemblies, but they may be of any soft resilient substance suitable for sealing purposes. I show swivelling sleeves 8 and 18, in the improved cap assemblies, as these aid in reducing the friction between the sealing members and the caps as the latter are screwed down on the valve casings to seal the latter.

Figure 3:
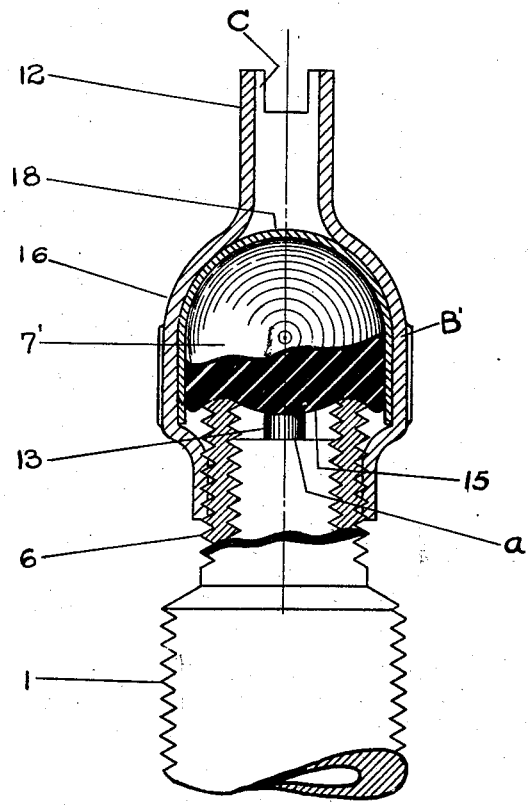
Fig. 3 is an enlarged vertical sectional view of a modified form of the invention.

The individual parts in the several assemblies are designated by reference characters as follows, viz:

1 is the usual valve casing.
2 is the check valve spring.
3 is the rim bushing for the usual dust cap.
4 is the inflating and deflating valve in assembly A'.
5 is the seal between assembly A' and the valve casing.
6 is the upper reduced threaded end of the valve casing.
6' is the threaded member on assembly A' that engages the internal thread in the upper end 6 of the valve casing.
7 is the sealing ball in the cap of Figs. 1 and 2.
7' is the sealing member in the cap of Fig. 3.
8 is the swivel sleeve in the cap of Figs. 1 and 2.
9 is the central housing of the built up cap of Figs. 1 and 2.
10 is the top housing of the built up cap of Figs. 1 and 2. The central and top housings, 9 and 10, are rigidly secured together after the insertion of the sleeve and sealing member.
11 is the usual dust cap.
12 is the reduced extension at the top of the valve cap, provided at its upper end with the cap member C for the usual socket wrench for screwing the check valve into and out of the valve casing.
13 is the usual deflating stem for the check valve.
15 indicates the lower, sealing end of member B'. The center of this sealing surface is convexly formed (ball shaped) and thus reaches down, when the seal of Fig. 3 is closed, into the bore of the casing and pushes the deflating stem down and opens the check valve substantially simultaneously with the sealing of the casing.
16 is the valve cap housing of Fig. 3. This housing differs from that of Figs. 1 and 2 in that it is a one piece housing.

The housing of Fig. 3 may be drawn up out of sheet metal or otherwise formed, with one end left full diameter for the insertion of the swivelling sleeve and the sealing member. After the insertion is made the open end may be spun down to finished form. Preferably the lower end is thus spun down and threaded into a neck that screws onto the reduced upper end of the valve casing.

18 is the swivel sleeve of Fig. 3. This sleeve may or may not be the same as swivel sleeve 8 of Figs. 1 and 2, depending on whether or not the sealing member be the same length as its diameter, or longer or shorter.

In Figs. 1 and 2 I have drawn an arbitrary line $a$ across the bore of the valve casing, at the same level in both figures. In Fig. 2, where the sealing valve is open, the deflating stem 13 reaches above the line $a$ to the top of the casing, whereas in Fig. 1, where the seal is closed, the stem is shortened above that line. This indicates that, in closing the seal, the ball 7 has also forced the stem 13 downwardly, thus opening the check valve at 4. Fig. 3 also shows the check valve as having been opened. This figure is on a larger scale than Fig. 1, but the proportion of the stem 13 above the line $a$ in Fig. 3 corresponds to the proportion of the stem above such line in Fig. 1.

Where swivelling sleeves are used such sleeves should be loosely enough assembled to insure proper swivelling and if no swivel sleeve be used the sealing member should itself be loosely assembled in its chamber.

I intend the caps, sealing members and swivelling sleeves shown in the several forms to be used interchangeably. Thus, for example, the one piece cap of Fig. 3 may be employed with the sealing ball of Figs. 1 and 2.

Having thus described my invention and without limiting myself to the precise constructions shown, what I claim and desire to secure by Letters Patent is:

In a valve cap for pneumatic tire valves, a body portion having a chamber therein, and having a neck portion adapted to screw on to the reduced upper end of the valve casing, a swivelling sleeve, and a soft vulcanized rubber ball loosely assembled in said chamber, such sleeve receiving the ball, and such ball being too large to be passed through the bore of said neck either into or out of the chamber of the valve cap and being adapted to seal the casing and open the check of the tire valve when the cap is screwed down, the walls of the chamber being permanently closed against withdrawal of the sleeve and ball.

In testimony whereof, I have hereunto subscribed my name.

WILLIAM H. DAVID.